INVENTOR.
Alexander Chadwick.
BY
Harness and Harris
ATTORNEYS.

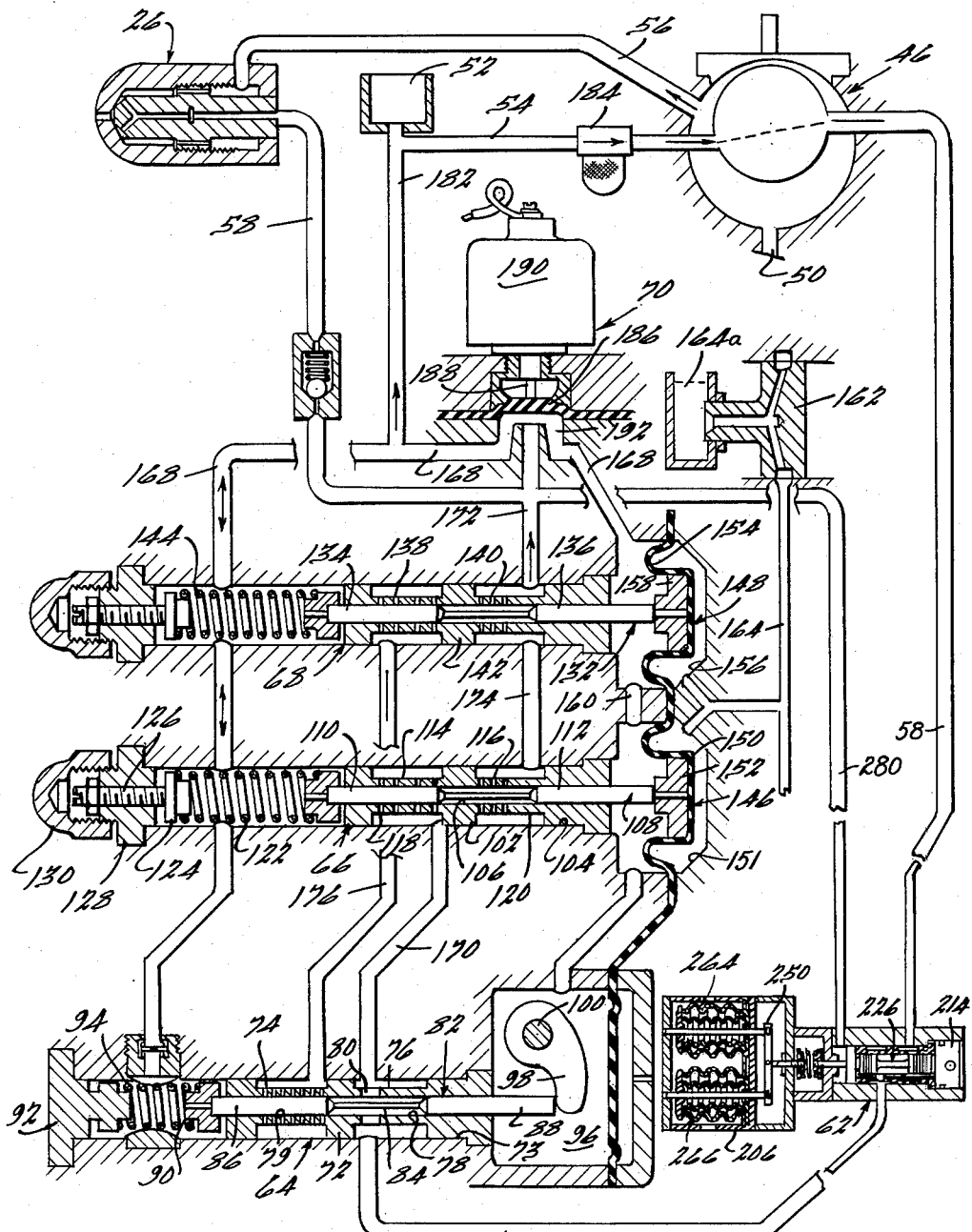

July 18, 1961
A. CHADWICK
2,992,530
FUEL CONTROL MECHANISM WITH AMBIENT TEMPERATURE
AND PRESSURE COMPENSATION
Original Filed Aug. 27, 1954
4 Sheets-Sheet 3
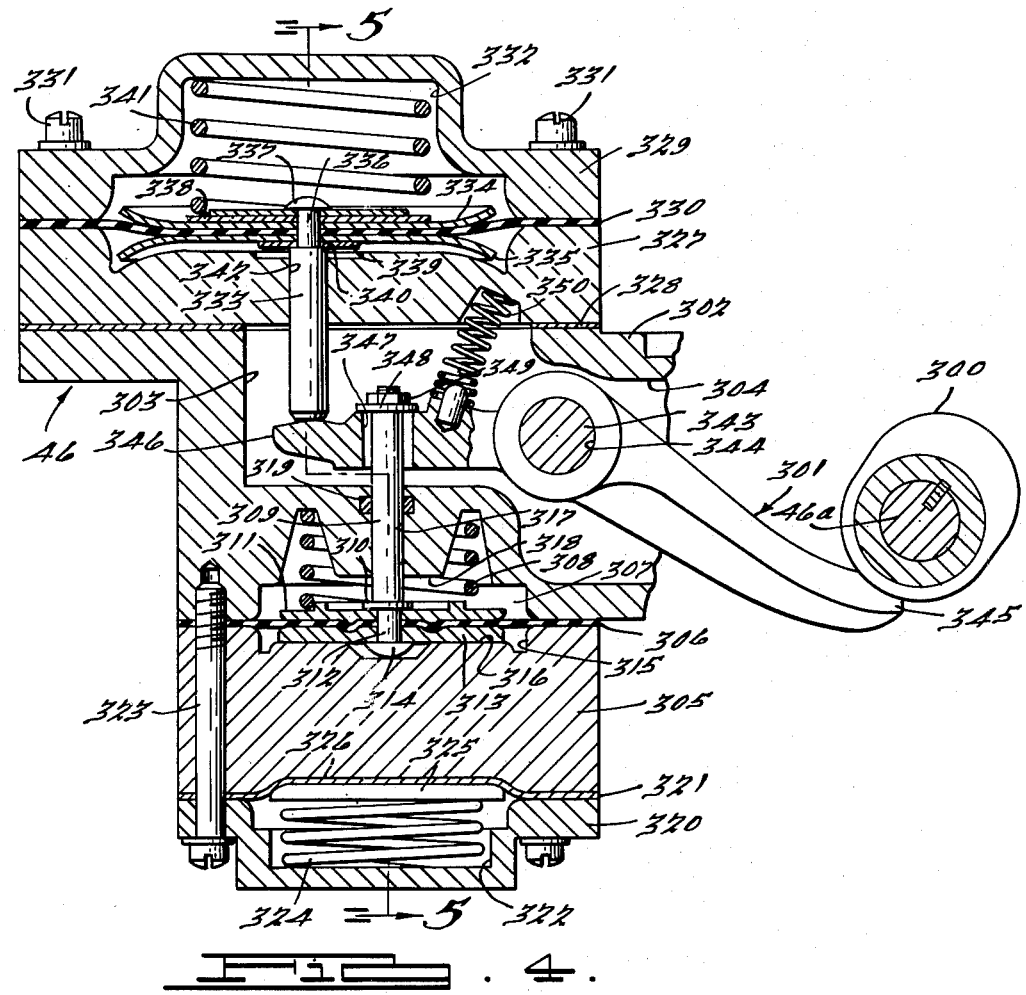
INVENTOR.
ALEXANDER CHADWICK.
BY
*Harness & Harris*
ATTORNEYS.

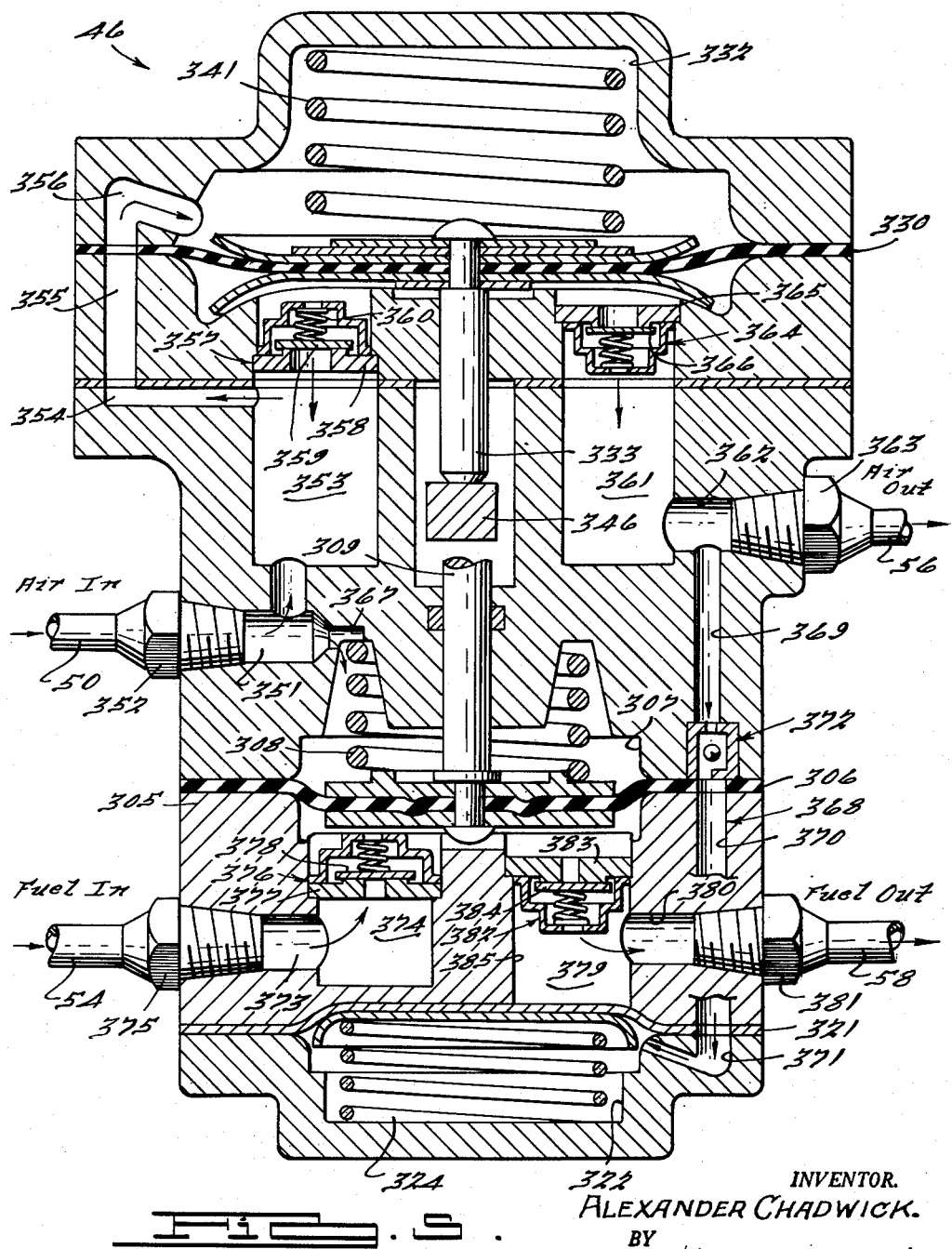

United States Patent Office 2,992,530
Patented July 18, 1961

2,992,530
FUEL CONTROL MECHANISM WITH AMBIENT TEMPERATURE AND PRESSURE COMPENSATION
Alexander Chadwick, Farmington, Mich., assignor to Chrysler Corporation, Highland Park, Mich., a corporation of Delaware
Continuation of application Ser. No. 452,568, Aug. 27, 1954. This application Jan. 29, 1960, Ser. No. 6,340
2 Claims. (Cl. 60—39.28)

My present invention relates generally to liquid fuel combustion apparatus and more particularly to a fuel supply mechanism for scheduling a controlled flow of liquid fuel to a liquid fuel burner in response to variations in certain of the operating parameters of the combustion apparatus, said burner being operatively associated with and forming a portion of the fuel combustion apparatus. This application is a continuation of my copending application Serial No. 452,568, filed August 27, 1954, now abandoned.

The fuel supply mechanism of my instant invention is particularly adapted to be used in operative association with a gas turbine power plant having a rotary compressor unit and a two-stage turbine rotatably mounted in coaxial relationship, one stage of the turbine being drivably coupled to the rotary compressor and the other stage being connected to a power output shaft. A suitable combustion chamber or burner may be provided for producing motive gases for powering each of the turbine stages.

An object of the present invention is to provide a new and improved fuel control valve mechanism which incorporates a unique fuel pressure regulator valve mechanism. This mechanism comprises a fuel metering orifice disposed in a fuel delivery conduit connected to the fuel discharge port of the fuel-air pump. A movable control valve element is adapted to progressively vary the size of the metering orifice. Suitable fluid passage means may be provided for subjecting one side of the movable valve element to the pressure which exists on the upstream side of the control valve mechanism and for subjecting the other side of the movable valve element to the pressure which exists on the downstream side of the control valve mechanism. The valve element is therefore operative to progressively vary the size of the metering orifice in response to variations in the pressure differential across the control valve mechanism. Upon a decrease in the pressure differential across the control valve mechanism, the movable valve element will open the size of the metering orifice thereby increasing the pressure on the upstream side of the control valve mechanism and restoring the pressure differential thereacross. Upon an increase in the pressure differential, the size of the metering orifice is decreased and the magnitude of the pressure differential across the control valve mechanism is reduced to a correct precalibrated value.

Another object of the present invention is to provide an improved fuel supply mechanism of the foregoing character comprising a diaphragm-type fuel-air pump, as for example as disclosed in Jorma O. Sarto Patent No. 2,819,588 (Serial No. 440,975) assigned to the assignee of my instant invention, in combination with a regulator valve mechanism as described above, whereby a particularly efficient fuel supply mechanism is achieved which avoids the customary fuel pump bypass system and enables important economies and simplifications in operation and manufacture of the mechanism.

In order to obtain uniform performance during the operation of the combustion apparatus, it is important to maintain the fuel and air mixture ratio in the combustion chamber at a substantially constant value. As the ambient air temperature and pressure vary, the air density is also varied and this causes corresponding variations in the fuel-air ratio.

According to a principal feature of my present invention, I have provided an ambient air temperature and pressure responsive actuator means having portions operatively connected to the movable control valve element of the above-described valve mechanism. The temperature and pressure responsive actuator means is effective to automatically make compensating adjustments in the fuel-air ratio during variations in ambient atmospheric conditions.

Another object of my present invention is to provide a new and improved regulator valve mechanism for use in combination with a liquid fuel burner apparatus having a fuel scheduling and metering valve assembly, said regulator valve comprising a means for adjusting the rate of delivery of fuel by said valve assembly to automatically compensate for variations in fuel-air ratio in the burner caused by changes in ambient air temperature and pressure.

For the purpose of more particularly describing my invention and the mode of operation thereof, I will refer to the accompanying drawings wherein:

FIGURE 2 is a schematic representation of the fuel supply mechanism of my instant invention;

FIGURE 4 is a cross sectional view of the fuel-air pumping unit; and

FIGURE 5 is a cross sectional view taken in the direction of the arrows substantially along the line 5—5 of FIGURE 4.

Figure 1:
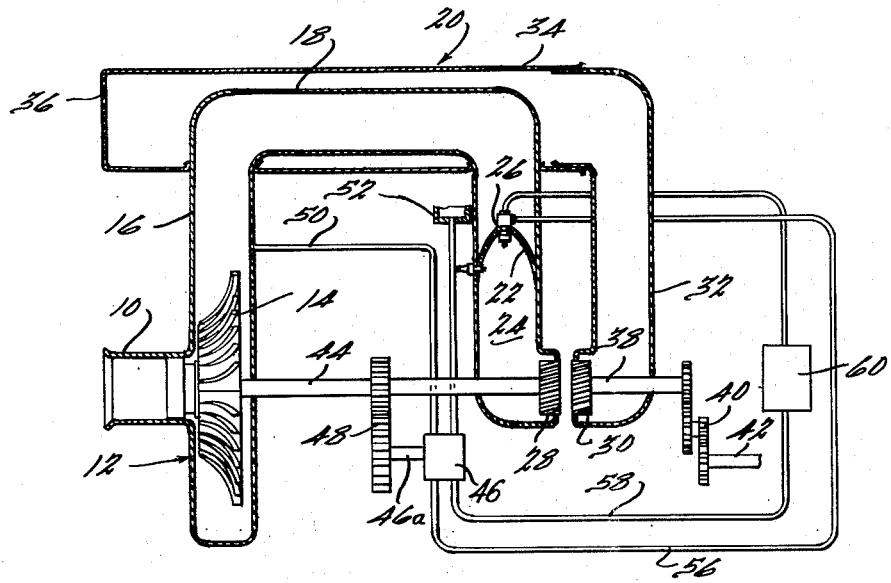
FIGURE 1 is a schematic representation of a gas turbine power plant incorporating the fuel supply mechanism of my instant invention.

Referring first to the gas turbine power plant shown schematically in FIGURE 1, an air intake port is shown at 10 for conducting ambient air to a radical flow intake air compressor 12. The compressor 12 comprises a bladed rotor 14 which is mounted for rotation about its central axis and which is effective to increase the pressure of the intake air and to discharge the same radially into a diffuser structure 16. A regenerator 20 is provided with a regenerator passage 18 which communicates with the diffuser structure 16. The temperature of the air is increased as it passes through passage 18. The air is then caused to pass through an apertured burner cone which forms a portion of a combustion chamber 24. Atomized liquid fuel is supplied to the burner cone 22 by means of nozzle 26 and is caused to burn in the combustion chamber 24 to produce motive gases which pass into the vicinity of a first stage 28 of a two-stage turbine wheel assembly. The motive gases impart a driving torque to the first turbine stage shown at 28, and then pass into the second turbine stage, shown at 30. A driving torque is also imparted to the second stage 30 by the motive gases which are then conducted through exhaust conduit structure 32 into another regenerator passage 34 within the regenerator 20. The high temperature exhaust gases passing through regenerator passage 34 are effective to increase the temperature of the air flow in the opposite direction through regenerator passage 18 and the thermal efficiency of the gas turbine cycle is correspondingly increased. The coolant exhaust gases then pass out a suitable exhaust port 36.

A driven shaft 38 is drivably connected to and powered by the second turbine stage 30. Suitable speed reduction gears may be provided, as shown at 40, for interconnecting shaft 38 with a power output shaft 42. Another shaft 44 is provided, as shown, for drivably connecting a compressor rotor 14 with the first turbine stage 28.

A fuel and air pumping unit is provided as shown at 46, FIGURE 1, and it may be powered by means of a suitable driving connection with the shaft 44 including speed reduction gears 48. Pump 46 is preferably of the type previously disclosed in the patent of Jorma O. Sarto referred to above. Air may be supplied to the fuel and air pumping unit 46 by means of conduit 50 which extends to and communicates with a high pressure portion of the diffuser structure 16. A liquid fuel reservoir 52 supplies the air and fuel pumping unit 46 with liquid fuel through a fuel supply conduit 54.

A air delivery conduit 56 extends from an air discharge portion of the pumping unit 46 to the fuel-air nozzle 26 located in the burner cone 22. Similarly, a fuel delivery conduit 58 extends from a fuel discharge portion of the fuel and air pumping unit 46 to the liquid fuel and air nozzle 26. A fuel control valve mechanism 60 is disposed in the fuel delivery conduit 58 for the purpose of regulating the rate of flow of liquid fuel to the nozzle 26.

Fuel control valve mechanism 60 may be more easily understood by referring to the schematic valving diagram of FIGURE 2. As best seen in FIGURE 2, the valving mechanism comprises five principal valve components shown at 62, 64, 66, 68, and 70. These five valve components may be incorporated, if desired, within a single valve body.

The valve component 64 may be designated as a "throttle valve" and it comprises a valve insert 72 received within a bore 73. The insert 72 includes a pair of annular recesses shown at 74 and 76 respectively, the former communicating with a central bore 78, in the insert 72 through a plurality of openings 79 and the latter communicating with the central bore 78 through one or more ports 80. A valve plunger 82 is slidably received within the bore 78 and it includes a reduced diameter section 84 between large diameter end portions 86 and 88. The large diameter portion 86 is adapted to progressively restrict the plurality of openings 79 upon axial movement of the plunger 82.

The end of the large diameter portion 86 of plunger 82 carries a spring seat member 90 near one end of the bore 73 and a closure member 92 is inserted within the end of the bore 73. A compression spring 94 is interposed between the closure member 92 and spring seat 90 for normally biasing the plunger 82 to the right as viewed in FIGURE 2. A hollow chamber 96 is provided within the valve body at the other end of the bore 73 for accommodating a throttle linkage lever 98 which is pivoted at 100 and which is adapted to slidably actuate the plunger 82 within the bore 78.

I prefer to refer to the valve component 66 as the "schedule and idle governor valve" and the structure thereof is substantially similar to that of the valve component 64. This valve 66 includes an insert 102 which is secured within a bore 104 formed in the valve body. The insert 102 is provided with a central axially extending bore 106 within which a plunger rod 108 is slidably disposed. Large diameter portions 110 and 112 of the rod 108 are adapted to progressively restrict a plurality of valve openings shown at 114 and at 116 respectively, said openings being formed in the valve insert 102 in the vicinity of annular recesses 118 and 120 respectively. A spring means 122 is provided for biasing the plunger 108 to the right as viewed in FIGURE 2. The compression force of the spring 122 may be adjusted by means of a movable spring seat 124 carried by an adjustable screw 126 which may be threadably received through a closure member 128. A protective cap 130 may be threadably received over the outer end of the closure member 128.

I prefer to refer to the valve component 68 as the "accelerating schedule and overspeed governor valve" and the structure thereof is substantially similar to that of the valve component 66. This valve 68 includes a plunger rod 132 having large diameter portions 134 and 136 which are adapted to progressively restrict valve ports 138 and 140 respectively, said ports being formed in a valve insert 142. A spring means 144 is provided, as shown, for biasing the plunger rod 132 to the right as viewed in FIGURE 2.

The valve components 66 and 68 are each provided with plunger rod actuators 146 and 148, respectively, for axially adjusting the position of the plunger rods 108 and 132 during the operation of the power plant. The actuator 146 comprises a flexible diaphragm 150 which is transversely disposed across the interior of a pressure chamber 151 situated within a portion of the valve body. An adaptor 152 is carried by the end of the large diameter portion 112 of the plunger rod 108 and I have secured the same in a suitable manner to the central portion of the flexible diaphragm 150.

The corresponding structure of the actuator 148 includes a flexible diaphragm 154, a pressure chamber 156, and a plunger rod adaptor 158. A passage 160 is provided, as shown, for interconnecting the portions of the pressure chambers 151 and 156 to the left of the diaphragms 150 and 154, respectively. The other portions of the chambers 151 and 156 to the right of the diaphragms 150 and 154 respectively, communicate with a high pressure discharge portion of a speed sensor rotor portion 162 through a fluid passage 164. This rotor 162 may be drivably connected in a suitable manner to the first turbine stage 28 and it may be supplied with speed sensing fluid by a self-contained fluid reservoir 164a.

A fluid passage 168 extends from the portion of chamber 156 on the left side of diaphragm 154 to the chambers occupied by the valve springs 144, 122, and 94 of the valve components 68, 66 and 64 respectively. The fuel delivery conduit 58 communicates with annular recess 76. A branch passage 170 forming an extension of fuel delivery passage 58 interconnects the annular space 76 of the valve component 64 with the annular space 118 of the valve component 66. Another passage 172 interconnects ports 140 of the valve component 68 with the terminal portion of the fuel delivery passage 58 and also the passage 168. A passage 174, which forms an extension of passage 172, interconnects the annular space surrounding valve ports 140 of the valve component 68 and the annular space 120 of the valve component 66. Another passage 176 is provided for interconnecting the annular space 74 of the valve component 64 and the annular space surrounding valve ports 138 of the valve component 68. The fuel supply conduit 54 for the fuel-air pumping unit 46 is connected to the fuel reservoir 52, as previously described, and is also connected to a branch passage 182 communicating with passage 168. A suitable filter element 184 may be provided, if desired, in the conduit 54.

I prefer to refer to the valve 70 as a "bypass valve" and it comprises a flexible diaphragm 186 which may be operatively secured to and actuated by a solenoid armature shaft 188. The solenoid actuator is shown at 190 and it is adapted to actuate the armature 188 in a vertical downward direction, as viewed in FIGURE 2, when energized by the ignition current of the power plant. Upon being deenergized, a solenoid spring, not shown, is effective to retract armature shaft 188 thereby causing diaphragm 186 to become unseated from an associated valve seat structure 192. It is thus apparent from FIGURE 2 that when the solenoid is energized, communication between passages 172 and 168 is interrupted.

When the engine is inoperative and when the ignition circuit is open, the valve elements of the above-described valve system assume the positions as shown in FIGURE 2. To start the power plant, the operator turns the ignition key to the "start" position thereby energizing solenoid 190 which causes the bypass valve 70 to close and to block the fluid connection between fluid passages 168 and 172. The ignition current is also effective to energize a suitable starter generator unit for the power plant and to accelerate the first turbine stage 28 and its associated structure. The fuel-air pumping unit 46 drivably connected to the first turbine stage, begins to deliver liquid fuel and air to the fuel-air nozzle 26 which in turn produces a combustible atomized liquid spray of fuel within the burner cone 22. The air supplied by the intake air compressor supports combustion of this atomized fuel within the combustion chamber 24. The high pressure fuel which is pumped through the delivery passage 58 will be caused to pass through the annular space 76 and passage 170. The fuel is then metered through certain of the openings 114 of the "schedule and idle governor valve" 66, and the metered fuel passes through the bore 106 in the valve insert 102 and then through the ports 116 to the annular space 120. The fuel then passes through passage 174 and communicating passage 172 to the terminal portion of fuel delivery conduit 58.

Since the speed sensor rotor 162 is drivably connected to the first turbine stage, the pressure in the passage 164 and in the chamber 151 on the right side of the diaphragm 150 will be caused to increase and to move the valve plunger rod 108 to the left against the force exerted by the spring 122. It is thus apparent that the metering ports 114 will be progressively opened as the power plant speed is increased and therefore a predetermined flow of fuel will be scheduled to the fuel-air nozzle 26. When the power plant reaches a predetermined idling speed, all of the ports 114 will be uncovered and the rate of fuel flow therethrough will be at a maximum. At speeds greater than idling speed the large diameter portion 112 of the plunger rod 82 will be caused to selectively restrict the ports 116 thereby decreasing the rate of fuel delivery until the power plant speed is again reduced to idling speed.

To accelerate the engine after idling speed has been obtained, the throttle linkage 98 may be actuated so that the plunger rod element 88 of the "throttle valve" 64 is adjusted axially against the biasing force of the spring 94 thereby opening the metering ports 79. As the metering ports 79 are uncovered, an increased quantity of fuel will be made available to the passage 176 extending to the annular space surrounding the valve ports 138 of the accelerating "schedule and overspeed governor valve" 68. The valve 68 will prevent this increased quantity of fuel from being immediately delivered to the fuel nozzle 26 until the fuel requirements of the power plant and the power plant speed are sufficiently great so that this increased quantity of fuel may be efficiently utilized. As the power plant speed increases, the valve actuator 148 moves the plunger rod 132 to the left, as viewed in FIGURE 2, and progressively opens the metering ports 138.

If the power plant exceeds the predeteremined maximum speed, the plunger rod 132 will be moved axially until the large diameter portion 136 of the plunger rod 132 will selectively restrict valve ports 140.

Since the rate of fuel delivery through the control valve mechanism 60 should be directly proportional to the total cross sectional area of the metering ports in the individual control valve components, it is essential that the pressure drop in the fuel delivery conduit 58 between the upstream side of the control valve mechanism and the fuel-air nozzle should remain substantially constant in order that the scheduling characteristics of the individual valve components will remain constant. For this reason, I have interposed a pressure regulator valve 62 in the fuel delivery conduit 58, as shown generally in FIGURE 2.

Figure 3:
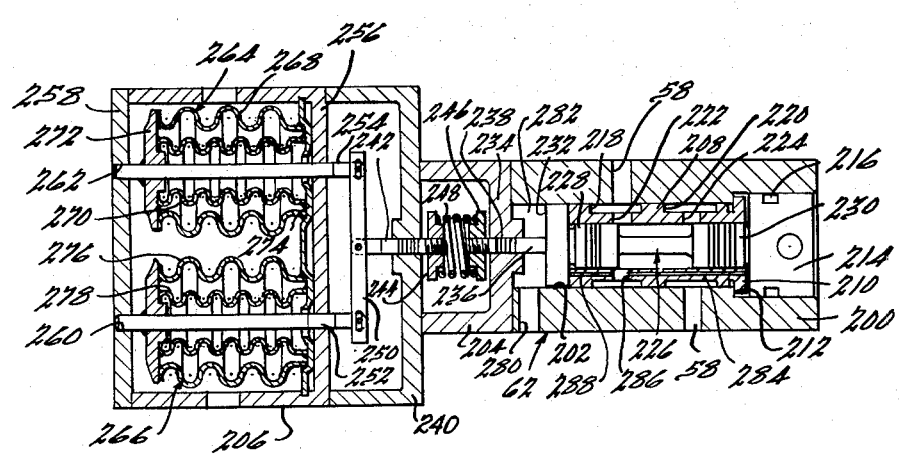
FIGURE 3 is an enlarged view of a pressure regulator valve used in combination with the valve mechanism shown in FIGURE 2, said regulator valve including a means for compensating for the effect of changes in the ambient air conditions.

The details of the construction of valve 62 may be best seen in the enlarged view of FIGURE 3. As illustrated in FIGURE 3, valve 62 comprises a multiple part housing, the various portions of which are identified by numerals 200, 204, and 206. The housing portion 200 may be cylindrical in shape and it is provided with a circular, axially extending opening 202 within which a hollow sleeve 208 is received. The sleeve 208 may be secured in place by means of a press fit. An end flange may be provided as shown at 210 and it may be adapted to engage a shoulder 212 formed about the inner periphery of the bore 202. The end of the bore 202 is closed by means of a circular insert 214, a suitable sealing ring 216 being provided about the periphery thereof as shown. The insert 214 may be secured in place by means of a set screw or the like.

Spaced annular grooves are formed about the outer periphery of the insert 208 as shown at 218 and 220, said grooves 218 and 220 communicating with the interior of the sleeve 208 through ports 222 and 224 respectively.

A movable valve element 226 is slidably received within the sleeve 208 and it comprises a spaced pair of large diameter portions 228 and 230 which are integrally connected as shown. An end flange or piston disc 232 is integrally secured to the valve portion 228 and is effective to limit the extent of movement of the valve element 226 with respect to the sleeve 208.

The housing portion 204 is provided with an end wall 234 which serves as a closure member for the hollow housing portion 200. An axially extending shaft 236 extends through the end wall 234 and is integrally secured to and forms a portion of the end flange 232 on the movable valve element 226. A suitable sealing means may be provided about the shaft 236 as shown at 238.

The housing portion 206 is provided with an end wall 240 against which the housing portion 204 is suitably secured. A shaft 242 is slidably received through the center of end wall 240 and a spring seat member 244 is threadably received on one end thereof as shown. A second spring seat member 246 is theadably received on the end of shaft 236 and a compression spring 248 is interposed between this spring seat 246 and the other spring seat 244.

Housing portion 206 encloses a compound lever mechanism comprising a lever element 250 which is secured intermediate its ends to shaft 242. Lever elements 252 and 254 are secured at either end of the lever element 250 and it extends axially in a direction parallel to the axis of the movable valve element 226 through a partition wall 256 transversely disposed across the interior of the housing portion 206. The extended end of the lever elements 252 and 254 are slidably received within suitable apertures formed in a housing end wall 258 as shown at 260 and 262 respectively.

A temperature capsule and an altitude capsule shown at 264 and 266 respectively, are interposed between the housing end wall 258 and the partition 256, the temperature capsule 264 being disposed about the lever element 254 and the altitude capsule 266 being disposed about the lever element 252.

The temperature capsule 264 comprises a substantially cylindrical outer boundary member 268 having a plurality of corrugations and an inner boundary member 270 is disposed within the outer boundary member 268, said member 270 being similarly corrugated. These corrugated boundary members 268 and 270 define a collapsible bellows, one end of which is secured to a base disc 272 which may be integrally secured to the linkage element 254 as shown. The other end of the bellows is secured to a base plate 274 which may be supported by the partition wall 256. The space defined by the boundary members 268 and 270 may be filled with a liquid having a relatively high coefficient of thermal expansion. It is also desirable that the liquid should have a relatively low freezing point and a relatively high boiling point in order that the control device might function throughout a relatively large range of operating temperatures.

The altitude capsule 266 is similar in construction to the above-described temperature capsule 264 and it comprises a collapsible bellows defined by corrugated boundary members 276 and 278. The altitude capsule may be filled with a suitable gas such as nitrogen which will expand in volume upon a reduction in the ambient air pressure.

The fluid delivery conduit 58 on the upstream side of the control valve 62 communicates with the annular groove 220. The downstream side of fuel delivery conduit 58 communicates with the annular groove 218. A branch conduit 280 communicates with conduit 172 on the downstream side of the control valve assembly and is connected to a pressure chamber 282 located on the left side of the circular end flange 232.

Fuel pressure is transmitted from the fuel delivery conduit on the downstream side of the valve 62 to the right side of the valve element 226 through a passage 284 and a port 286 which communicates with the annular space 218. This same fuel pressure is transmitted to the right side of the flange or disc 232 through a conduit 288 and the port 286.

It is thus seen that as the pressure differential across the fuel valve control mechanism is increased above a predetermined value, the large diameter valve portion 230 will be caused to move to the left to progressively restrict the fuel delivery conduit 58. This in turn will automatically reduce the pressure differential to the desired value. If the pressure differential across the fuel control valve mechanism is decreased, the pressure in the chamber 282 to the left of the piston disc 232 together with the force exerted by the spring 248 will no longer balance the opposing force caused by the pressure exerted on the right side of the large diameter valve portion 230 and on the right side of the flange or disc 232. The valve portion 230 will therefore progressively open the fuel delivery passage 58 until the correct pressure differential across the fuel control valve mechanism is again restored.

If the ambient air temperature increases, the capsule 264 will expand longitudinally and the linkage element 250 will be caused to move to the left as viewed in FIGURE 3. This will in turn cause the shaft 242 and the spring seat member 244 to move to the left which reduces the tension of spring 248. The forces acting on the valve element 226 will therefore be temporarily out of balance and the valve element 226 will move to the left until the spring 248 is again compressed and the forces on the valve element are again balanced. The fuel delivery passage 58 is therefore restricted to a greater extent during operation at high ambient air temperature than it is during operation at lower ambient temperature. The ratio of the pounds of fuel used per hour to the pounds of air used per hour is accordingly maintained at a substantially constant value even though the density of the air undergoes changes caused by changing ambient temperature.

Likewise, a reduction in the ambient air pressure will be accompanied by an expansion of the capsule 266 which will cause the linkage element 250 and the spring seat member 244 to move to the left. This will also cause an added restriction in the fuel delivery conduit 58 which, as above explained, will be effective to maintain the fuel-air mixture ratio at a substantially constant value.

It is obvious from the foregoing that the valve device 62 will also function to increase the fuel supply upon a decrease in the ambient air temperature or an increase in the ambient air pressure.

Referring in more particularity to the fuel-air pump 46 illustrated in FIGURES 4 and 5, the accessory drive gear means shown generally at 48 has its input driving gear drivably connected to the compressor drive shaft 44 and its output driven gear drivably connected to a camshaft 46a, see also FIGURE 1. As best seen in FIGURE 4, the camshaft 46a carries a cam element 300 which is adapted to actuate a rocker arm 301 forming a portion of the fuel pumping unit of my instant invention.

The pumping unit 46 comprises a multiple piece cast housing structure having a center portion 302, said center portion 302 including an interior chamber 303 and a lateral side opening 304 which interconnects the interior chamber 303 with the exterior of the pump. A lower housing portion is provided at 305 and is secured to the lower surface of the intermediate housing portion 302 and is separated therefrom by means of a flexible fuel diaphragm element 306. This fuel diaphragm element 306 is secured at its periphery between the mating surfaces of the housing portion 302 and 305 and is extended transversely across a recess 307 formed in the lower surface of the housing portion 302. The recess 307 includes an annular portion within which is disposed a compression spring means 308 which is adapted to bias the flexible fuel diaphragm element 306 in a downward direction.

The diaphragm element 306 is centrally secured to a vertically movable diaphragm actuating shaft 309, said shaft being provided with a radial shoulder element 310 against which a first clamping element 311 is positioned. The clamping element 311 is centrally apertured to receive therethrough a reduced diameter end portion 312 of the shaft 309. A second centrally apertured clamping element 313 is positioned on the reduced diameter portion 312 in juxtaposition with respect to the element 311, said elements 311 and 313 being adapted to clamp therebetween the central portion of the diaphragm element 306. A suitable fastening means 314 is secured at the end of the reduced diameter end portion 312 to retain the elements 311 and 313 in clamping engagement with the diaphragm element 306. The spring means 308 is seated on the upper surface of the clamping element 311 as shown.

The lower housing portion 305 is recessed at 315 on the upper surface thereof for the purpose of receiving the clamping element 313, said element 313 being seated on a flat bottom surface 316 of the recess 315 when the fuel diaphragm element 306 assumes a downward position.

The shaft 309 is slidably received in an axially extending opening 317 and is caused to reciprocate therein upon deflection of the fuel diaphragm element 306 is which it is secured, as previously described. A sufficient clearance exists between the body surface 318 within annular recess 307 and diaphragm 306 to permit an appreciable deflection of the latter. A suitable sealing means may be provided, if desired, as shown at 319.

A lower cap member 320 is positioned at the bottom side of the lower housing portion 305. A surge diaphragm element 321 is secured at its periphery between juxtaposed surfaces of the housing portion 305 and the lower cap member 320. The surge diaphragm element 321 is extended transversely across a central chamber 322 defined by the cap member 320. Suitable fastening means 323 may be provided for maintaining the cap member 320 and the lower housing portion 305 in integrally assembled relationship with respect to the central housing portion 302.

A surge spring means 324 is disposed within the central chamber 322 formed in the cap member 320 and is adapted to bias the diaphragm element 321 in an upward direction as viewed in FIGURES 4 and 5. A spring seat member 325 may be positioned against the diaphragm 321 as shown. The bottom surface of the lower housing portion 305 may be recessed at 326 to allow a limited vertical deflection of the diaphragm 321 to take place.

An upper housing portion 327 is secured to the upper surface of the central housing portion 302. The adjacent surfaces of the respective housing portions 327 and 302 may be separated by a suitable gasket material 328. An upper cap member 329 is positioned on the upper side of the upper housing portion 327 and a flexible air diaphragm element 330 may be secured about its periphery between the adjacent surfaces of the cap member 329 and the housing portion 327. The cap member 329 and the upper housing portion 327 may be secured in integrally assembled relationship with respect to the housing portion 302 by means of suitable fastening means or bolts 331.

The air diaphragm element 330 is extended transversely across an upper central chamber 332 defined by the upper cap member 329 and is secured at the central portion thereof to a vertically movable actuating shaft 333. The means for securing the shaft 333 to the diaphragm element 330 comprises a first clamping element 334 and a second clamping element 335 which are centrally received on a reduced diameter end portion 336 of the shaft 333. The clamping elements 334 and 335 are disposed on opposite sides of the air diaphragm element 330 and may be held in clamping engagement therewith by suitable fastening means which may consist of a fastener head 337 and spacer elements 338 and 339. The spacer element 339 is positioned as shown against a shoulder 340 formed on the shaft 333.

An air spring means 341 is interposed between the upper wall of the cap member 329 and the diaphragm 330 and is adapted to bias the latter in a downward direction. The shaft 333 is slidably received within an opening 342 formed in the upper housing portion 327 and is caused to reciprocate therein upon deflection of the diaphragm element 330.

As best seen in FIGURE 4, the rocker arm 301 is mounted within the interior chamber 303 of the center housing portion 302 by means of a suitable bearing pin 343 which is received through a bearing aperture 344 in the rocker arm 301. The pin 343 may be journalled in any suitable manner to the housing portion 302 and it extends transversely across the chamber 303 as shown. The rocker arm 301 includes a portion 345 which extends to the exterior of the pumping unit through the aperture 304. The extended end of the arm portion 345 functions as a cam follower and is adapted to operatively engage the cam surface of the previously mentioned cam element 300. Another portion 346 of the rocker arm 301 extends within the interior chamber 303 and is adapted to operatively engage the end of the diaphragm actuating shaft 333. The arm portion 346 is further provided with an opening 347 through which the diaphragm actuating shaft 309 is slidably received, said actuating shaft 309 being provided at the upper end thereof with a washer 348 which is secured in the position shown by a suitable fastening means 349.

The cam element 300 is effective to cause the rocker arm 301 to oscilalte about the bearing pin 343, a suitable spring means 350 being interposed between the upper housing portion 327 and the rocker arm portion 346 to normally bias the rocker arm 301 in a counterclockwise direction and to maintain the arm portion 345 in contact with the cam element 300. When the rocker arm 301 oscillates in a clockwise direction, each of the diaphragm actuating shafts 309 and 333 are moved in an upward direction. When the rocker arm 301 oscillates in a counterclockwise direction, the shafts 309 and 333 are returned to the position shown in FIGURE 4 by virtue of the force exerted by the compression springs 308 and 341, said downward movement being independent of the rocker arm 301. It is thus seen that the connections between each of the shafts 309 and 333 and the arm portion 346 are of the lost motion type and the rocker arm 301 is adapted to positively actuate these shafts only in one direction.

Referring to the cross sectional view of FIGURE 5, an air inlet port is shown at 351 within which is received a suitable conduit fitting 352 disposed at the end of the air delivery conduit 50. Port 351 provides communication between the conduit 50 and a vertically extending air passage portion 353 formed within the interior of the central housing portion 302. Other communicating passage portions 354, 355, and 356 are provided in the housing portion 302, housing portion 327 and cap member 329, respectively, to provide communication between the air passage portion 353 and the chamber 332. The air passage portion 353 communicates with the space below the diaphragm 330 through a one-way check valve structure 357 which comprises an orifice element 358 and a movable valve element 359. A spring means 360 is provided for biasing the valve element 359 into engagement with the orifice element 358 to permit the flow of air from the passage portion 353 into the space below the air diaphragm 330 and to prevent a flow of air in the reverse direction. This space below the air diaphragm 330 will hereinafter be referred to as the air working chamber.

The central housing portion 302 is further provided with another vertically extending air passage means 361 for accommodating the flow of air from the air working chamber below the air diaphragm 330 to an air outlet port 362, said port 362 providing communication between air delivery conduit 56 and the air passage portion 361. The delivery conduit 56 is provided with a suitable terminal fitting 363 for securing the same to the pump housing portion 302. The flow of air from the air working chamber into the passage portion 361 is controlled by a one-way check valve structure 364 which is similar in construction to the previously described valve structure 357 and which includes an orifice plate 365 together with a spring loaded valve element 366 for providing one-way flow through the orifice plate 365.

An opening is provided at 367 within the housing portion 302 for the purpose of providing communication between the air inlet passage portion 353 and the recess 307 on the upper side of the diaphragm element 306. Also, a branch air passage means is provided at 368 for the purpose of interconnecting the central chamber 322 and the air passage portion 361. This branch air passage comprises three communicating portions 369, 370, and 371 formed in the housing portion 302, the housing portion 305, and the lower cap member 320, respectively. A suitable one-way check valve having a slow bypass leakage rate is provided at 372 to permit the flow of fluid from the air passage portion 361 and to retard the flow of fluid through the branch passage 368 in the opposite direction.

A liquid fuel inlet port 373 is formed in the lower housing portion 305 to provide communication between an inlet fuel passage portion 374 and the fuel conduit 54, said fuel conduit 54 including a suitable fitting 375 at the terminal portion thereof which is threadably received within the port 373. The fuel passage portion 374 communicates with the space below the flexible diaphragm element 306 through a one-way check valve structure 376, said valve structure 376 including an apertured plate 377 and a movable valve element 378 which is spring biased against the apertured plate 377 to permit the flow of fluid from the passage portion 374 to the space below the fuel diaphragm element 306 and to prevent the flow of fuel in the reverse direction. This space below the fuel diaphragm 306 will hereinafter be referred to as the fuel working chamber.

Similarly another fuel passage portion is provided at 379 for accommodating the flow of fuel from the fuel working chamber to a fuel outlet port 380 which communicates with the fuel delivery conduits 58. This conduit 58 is provided with a suitable fitting 381 which may be threadably received within the port 380.

A one-way valve structure is provided at 382 to provide communication between the fuel working chamber and the fuel passage portion 370. The valve structure 382 is similar in construction to the valve structure 376 and comprises an apertured plate 383 disposed transversely across the fuel passage portion 379 and a spring biased movable valve element 384 to permit the flow of fluid into the fuel passage portion 379 and to prevent the flow of fuel in the reverse direction. An opening 385 is provided between the passage portion 379 and a space above the surge diaphragm element 321. This space is adapted to function as a surge chamber and will be subsequently described in particular detail.

During the operation of the pumping unit, the rotary elements of the power plant are effective to oscillate the rocker arm 301 about the mounting pin 343 by virtue of the rotary movement of the cam element 300, as previously described. When the rocker arm 301 is rotated in a clockwise direction, the diaphragm elements 306 and 330 are deflected in an upward direction by virtue of the lost motion connection between the rocker arm portion 346 and the diaphragm actuating shafts 309 and 333. During this upward stroke of the diaphragm actuating shafts, liquid fuel is caused to enter the fuel working chamber through the check valve structure 376. Simultaneously the compressed intake air is caused to enter the air working chamber through the check valve structure 357.

When the rocker arm 301 is caused to rotate in a counterclockwise direction, the force exerted by the air spring 341 on the air diaphragm element 330 in a downward direction is effective to cause the compressed air in the air working chamber below the air diaphragm element 330 to be forced into the air passage portion 361 and the communicating air delivery conduit 56. Simultaneously, the downward force exerted by the fuel spring 308 on the fuel diaphragm element 306 is effective to force liquid fuel from the fuel working chamber below the fuel diaphragm element 306 through the check valve structure 382 into the fuel passage portion 379 and the communicating fuel delivery conduit 58. During this working stroke of the fuel diaphragm element 306, the inlet air pressure in the air passage portion 361 is effective to supplement the working effort of the fuel spring 308 by virtue of the communication provided by opening 367 between the air passage portion 353 and the fuel spring chamber defined by the recess 307.

Air pressure is delivered to the spring chamber 322 below the surge diaphragm element 321 through the branch air passage 368 during the working stroke of the air diaphragm element 330. The discharge fuel pressure in the passage portion 379 is effective to deflect the surge diaphragm element 321 in a downward direction against the upward biasing force of the surge spring 324 and the upward force exerted by the air pressure in the spring chamber 322. Upon termination of the fuel pumping stroke and during the succeeding intake stroke of the fuel diaphragm, fuel pressure may be maintained in the fuel delivery conduit 58 by virtue of the combined forces exerted by the spring 324 and the air pressure within the spring chamber 322. The surge diaphragm 321 is thereby effective to substantially eliminate large variations in the magnitude of the fuel delivery pressure during the operation of the pumping unit.

The working effort provided by the air spring 341 is supplemented by the air pressure which is transmitted to the chamber 332 through the branch passage portions 354, 355, and 356. It is thus apparent from the foregoing description that the total air discharge pressure delivered by the air working chamber of the pumping unit of my instant invention will at all times be greater than the pressure which exists in the combustion chamber of the fuel combustion apparatus. The magnitude of this pressure differential will be substantially constant and will be equal to the air pressure produced by the biasing force of the air spring 341.

It is likewise apparent that the fuel discharge pressure delivered by the fuel working chamber will at all times be greater than the pressure which exists in the combustion chamber. The magnitude of this pressure differential will be equal to the magnitude of the fuel pressure which is produced by the biasing force of fuel spring 308.

When the fuel and air delivery requirements of the fuel combustion apparatus are temporarily reduced to some very small value during operation, the fuel and air diaphragms will remain in an upward position, as viewed in FIGURES 4 and 5, and the rocker arm 301 will be ineffective to cause a further pumping action to take place. This feature is made possible by virtue of the lost motion connection between the rocker arm and the diaphragm actuator shafts and by virtue of the independent operation of the fuel and air working springs. The pumping unit therefore incorporates an inherent flow limiting means and thus requires no separate relief valve. The pumping unit is effective to deliver fuel and air only at a rate which is sufficient to meet the operating requirements of the combustion apparatus. Further, if the fuel and air delivery requirements are only moderately reduced, the rate of deflection of the fuel and air diaphragms during their respective working strokes is correspondingly reduced.

It is not essential that the air diaphragm and the fuel diaphragm should be deflected simultaneously in the same direction by the respective diaphragm actuating springs. I contemplate that one of the pumping diaphragms might be actuated by the rocker arm upon oscillation thereof in one direction and that the other pumping diaphragm might be actuated by the rocker arm upon oscillation thereof in the opposite direction. The lost motion connection between the diaphragm actuating shafts and the rocker arm may be readily altered to provide such an alternating motion of the respective pumping diaphragms.

The actuating springs for the respective pumping diaphragms may also readily be adapted so that the air diaphragm and the fuel diaphragm are biased in opposite directions, appropriate modifications to the pump housing structure being required.

By virtue of the foregoing, including the diaphragm-type pump 46 in combination with the regulator valve 62 arranged as described, a simplified and economically manufactured fuel supply system is enabled which is characterized by improved operating fuel pressure control and which in particular avoids a pump bypass system required heretofore by conventional fuel supply systems. Thus in addition to economy and simplification of structure, regulation of fuel in a bypass system, with consequent power loss and overheating of the fuel, are avoided.

Having thus described one operative embodiment of my invention, what I claim and desire to secure by United States Letters Patent is:

1. In a fuel supply system for an internal combustion enigne having a burner, compressor means for supplying pressurized combustion supporting air to said burner, a fuel-air atomizing nozzle effective to receive pressurized fuel and atomizing air from separate sources and to discharge an atomized fuel-air mixture into said burner, fuel conduit means connected with said nozzle, variable displacement fuel pumping means connected with said fuel conduit means for supplying pressurized fuel to said nozzle from a source of fuel, said fuel pumping means being operably connected with said compressor means to receive biasing air pressure therefrom and being effective to discharge fuel into said fuel conduit means at a predetermined increment of pressure greater than said biasing air pressure, said fuel pumping means being yieldable against a predetermined limited fuel back pressure to supply fuel to said nozzle only as required by said engine, means for supplying pressurized atomizing air to said nozzle comprising air pumping means connecting said compressor means and nozzle for pumping pressurized air from the former to the latter at a predetermined increment of pressure greater than the air pressure from said compressor means, fuel scheduling means in said fuel conduit means responsive to an operating parameter of said engine for metering fuel flow through said fuel conduit means, and pressure regulator means responsive to changes in the pressure differential across said scheduling means for minimizing changes in said pressure differential.

2. The combination according to claim 1 wherein said fuel pumping means comprises a pumping chamber defined in part by a movable wall, actuating means operable alternately to displace said wall positively in one direction to enlarge the volume of said chamber in a fuel inlet stroke and then to release said wall for movement in a second direction to decrease the volume of said chamber in a fuel pumping stroke, means connecting said wall with said biasing air pressure to urge said wall in said second direction, resilient means cooperating with said biasing air pressure to urge said wall in said second direction to discharge fuel into said fuel conduit means from said chamber at said predetermined increment of pressure greater than said biasing air pressure, and valve means associated with said chamber for admitting fuel thereto during each inlet stroke and for discharging fuel therefrom through said conduit means during each pumping stroke, and wherein said pressure regulator means comprises a metering valve in said conduit means, and means responsive to the fuel pressure differential in said conduit means across said fuel scheduling means for actuating said valve to regulate said pressure differential.

References Cited in the file of this patent

UNITED STATES PATENTS

| | | |
|---|---|---|
| 2,416,453 | Mather et al. | Feb. 25, 1947 |
| 2,502,679 | Stanly | Apr. 4, 1950 |
| 2,575,229 | Moore | Nov. 13, 1951 |
| 2,616,254 | Mock | Nov. 4, 1952 |
| 2,616,508 | Mock | Nov. 4, 1952 |
| 2,638,739 | Barr | May 19, 1953 |
| 2,819,588 | Sarto | Jan. 14, 1958 |
| 2,848,869 | Russ | Aug. 26, 1958 |
| 2,901,030 | Chadwick | Aug. 25, 1959 |

FOREIGN PATENTS

| | | |
|---|---|---|
| 1,077,684 | France | May 5, 1954 |